United States Patent
Gahlot et al.

(10) Patent No.: US 11,023,582 B2
(45) Date of Patent: Jun. 1, 2021

(54) IDENTIFICATION AND CONTROL OF MALICIOUS USERS ON A DATA STORAGE SYSTEM

(71) Applicant: EMC IP Holding Company LLC, Hopkinton, MA (US)

(72) Inventors: Jai Prakash Gahlot, Pune (IN); Amit Kumar Chauhan, Pune (IN); Shiv Shankar Kumar, Pune (IN)

(73) Assignee: EMC IP HOLDING COMPANY LLC, Hopkinton, MA (US)

(*) Notice: Subject to any disclaimer, the term of this patent is extended or adjusted under 35 U.S.C. 154(b) by 383 days.

(21) Appl. No.: 16/225,928

(22) Filed: Dec. 19, 2018

(65) Prior Publication Data

US 2020/0201995 A1 Jun. 25, 2020

(51) Int. Cl.
| | | |
|---|---|---|
| *G06F 21/56* | (2013.01) | |
| *G06F 21/62* | (2013.01) | |
| *G06F 21/60* | (2013.01) | |
| *G06F 11/34* | (2006.01) | |
| *G06F 16/17* | (2019.01) | |

(52) U.S. Cl.
CPC ........ *G06F 21/565* (2013.01); *G06F 11/3438* (2013.01); *G06F 16/1734* (2019.01); *G06F 21/566* (2013.01); *G06F 21/604* (2013.01); *G06F 21/6218* (2013.01); *G06F 2201/81* (2013.01); *G06F 2201/88* (2013.01); *G06F 2221/2137* (2013.01); *G06F 2221/2141* (2013.01); *G06F 2221/2149* (2013.01)

(58) Field of Classification Search
CPC ........ G06F 21/50; G06F 21/55; G06F 21/552; G06F 21/554; G06F 21/56; G06F 21/561; G06F 21/562; G06F 21/564; G06F 21/60; G06F 21/62; G06F 21/604; G06F 21/6218

See application file for complete search history.

(56) References Cited

U.S. PATENT DOCUMENTS

| | | | |
|---|---|---|---|
| 7,069,447 B1* | 6/2006 | Corder | G06F 21/79 713/168 |
| 7,702,693 B1* | 4/2010 | Aiyagari | G06F 21/6218 707/785 |
| 9,491,182 B2* | 11/2016 | Kong | H04L 63/105 |
| 10,055,586 B1* | 8/2018 | Roundy | H04L 63/1441 |
| 10,904,277 B1* | 1/2021 | Sharifi Mehr | H04L 43/08 |
| 2006/0020814 A1* | 1/2006 | Lieblich | H04L 63/14 713/182 |

(Continued)

*Primary Examiner* — Richard A McCoy
(74) *Attorney, Agent, or Firm* — Amin, Turocy & Watson, LLP

(57) ABSTRACT

Identification and control of malicious users on a data storage system is described herein. A data storage system as described herein can include a file tracking component that records identities of users that have made at least one modification to a file stored on the data storage system, resulting in a set of recorded users; a user monitor component that increments respective malware counts associated with respective users of the set of recorded users in response to a malware scan of the file indicating that the file contains malware; and an access control component that restricts usage of the data storage system by a first user of the set of recorded users in response to a malware count associated with the first user exceeding a first threshold.

18 Claims, 13 Drawing Sheets

(56) References Cited

U.S. PATENT DOCUMENTS

| | | | |
|---|---|---|---|
| 2009/0172788 A1* | 7/2009 | Vedula | H04L 63/1441 726/5 |
| 2010/0002249 A1* | 1/2010 | Nuggehalli | H04N 1/00411 358/1.14 |
| 2011/0093946 A1* | 4/2011 | Chen | H04L 63/1416 726/13 |
| 2014/0075556 A1* | 3/2014 | Wicherski | G06F 21/52 726/23 |
| 2016/0275288 A1* | 9/2016 | Sethumadhavan | G06F 21/566 |
| 2016/0283711 A1* | 9/2016 | Li | G06F 11/3409 |
| 2017/0091471 A1* | 3/2017 | Su | G06F 21/6218 |
| 2017/0193201 A1* | 7/2017 | Eccleston | G06F 21/552 |
| 2018/0176244 A1* | 6/2018 | Gervais | G06F 21/604 |

* cited by examiner

700

| Malware Count Threshold | Damage Control Policy Code | Damage Control Policy Description |
|---|---|---|
| 20 | F | Disable all access, rectify offline with user |
| 15 | E | Revoke read permissions from all shares for 24 hours |
| 10 | D | Revoke read permissions from one share for 24 hours |
| 7 | C | Revoke write permissions to all shares for 12 hours |
| 4 | B | Revoke write permissions to one share for 12 hours |
| 1 | A | Scan future writes by user for next 24 hours |

| User ID | User Name | Malware Count | Damage Control Policy |
|---------|-----------|---------------|-----------------------|
| 1 | Alice | 5 | B |
| 2 | Bob | 2 | A |
| 3 | Cindy | 10 | D |
| 4 | Daniel | 1 | C |
| 5 | Emily | 20 | F |
| 6 | Frank | 6 | B |

FIG. 8

IDENTIFICATION AND CONTROL OF MALICIOUS USERS ON A DATA STORAGE SYSTEM

TECHNICAL FIELD

The subject application is related to data storage systems, and more particularly, to techniques for managing security of a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms or systems, provide the means by which these large sets of data can be maintained in an efficient and reliable way. To facilitate system efficiency and scalability, an NAS system can utilize a distributed system in which storage and/or computing resources are distributed among multiple computing nodes, which in turn can be arranged into computing clusters. Additionally, an NAS system can be designed as a single-space storage solution, in which data are stored on the platform via a single volume and a single file system, thereby granting a client connected to any computing node of the platform the ability to access all data stored on the platform.

NAS systems can operation in combination with antivirus servers (AVSs) and/or other anti-malware servers in order to prevent malware-infected files from entering or residing on the platform. For instance, files stored on and/or accessed by an NAS system can be scanned for viruses or other malware by AVSs that are external to the data storage system and/or by other entities. Since an NAS system can provide a shared storage space for numerous users, the security of an NAS system can be adversely impacted by one or more users that attempt to place malware onto the system. A malicious user may do this intentionally to infect the system, or alternatively an innocent user may do this unknowingly by, e.g., writing files into the system that have been copied from an infected storage source. In some cases, the presence of multiple infected files that were created or modified by the same user can suggest that the same user may attempt to place more infected files on the system in the future.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes a memory that stores computer executable components and a processor that executes computer executable components stored in the memory. The computer executable components can include a file tracking component that records identities of users that have made at least one modification to a file stored on the data storage system, resulting in a set of recorded users, a user monitor component that increments respective malware counts associated with respective users of the set of recorded users in response to a malware scan of the file indicating that the file contains malware, and an access control component that restricts usage of the data storage system by a first user of the set of recorded users in response to a malware count associated with the first user exceeding a first threshold.

In another aspect, a method is described herein. The method can include recording, by a device operatively coupled to a processor, user identities that are associated with having made at least one modification to a file stored on the data storage system, resulting in a group of recorded user identities; in response to a malware scan of the file indicating that the file contains malware, incrementing, by the device, respective malware counts associated with respective ones of the group of recorded user identities; and, in response to a malware count associated with the a user identity of the group of recorded user identities being determined to exceed a first threshold, restricting, by the device, usage of the data storage system when the usage is associated with the first user identity.

In an additional aspect, a machine-readable medium including computer executable instructions is described herein. The instructions, when executed by a processor of a data storage system, can facilitate performance of operations including recording identities of users that have made at least one modification to a file stored on the data storage system, resulting in recorded users, incrementing respective malware counts associated with respective ones of the recorded users in response to a malware scan of the file indicating that the file contains malware, and restricting usage of the data storage system by a first user of the recorded users in response to a malware count associated with the first user exceeding a first threshold.

DESCRIPTION OF DRAWINGS

Various non-limiting embodiments of the subject disclosure are described with reference to the following figures, wherein like reference numerals refer to like parts throughout unless otherwise specified.

FIG. 7 is a diagram depicting an example damage control policy structure that can be used in accordance with various aspects described herein.

FIG. 8 is a diagram depicting another example structure for a malicious user data structure that can be used in accordance with various aspects described herein.

DETAILED DESCRIPTION

Figure 1:
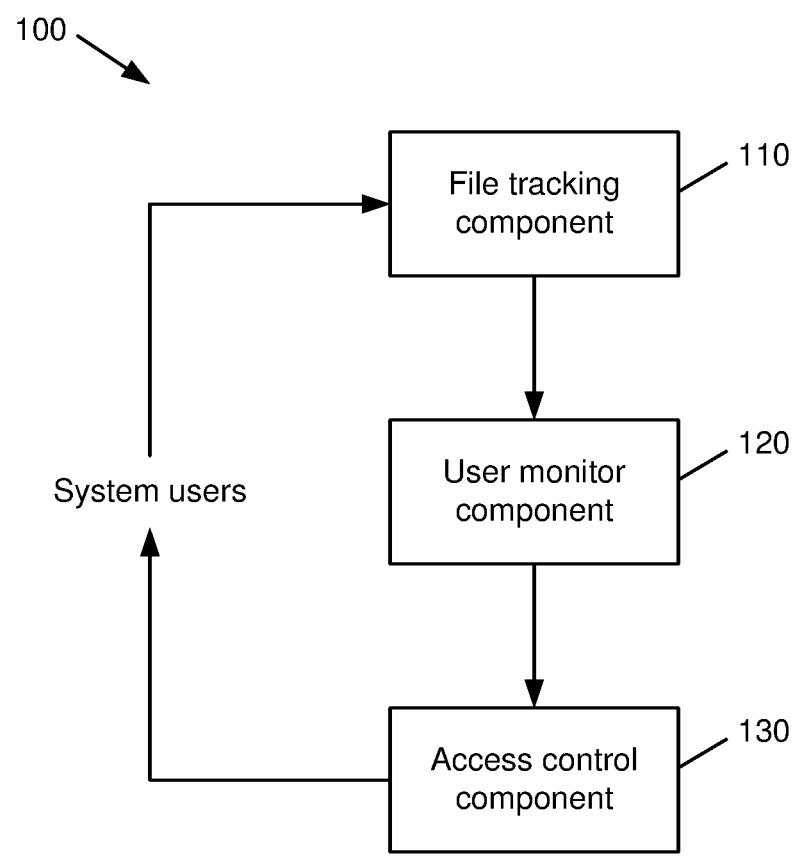
FIG. 1 is a block diagram of a system that facilitates identification and control of malicious users on a data storage system in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a network-attached storage (NAS) platform can serve as a storage environment for various types of data, which can provide a functionally unlimited amount of storage space for multiple users via a seamless single volume and a single file system. To facilitate management of and access to large-scale data sets, an NAS platform can utilize a distributed computing system that includes multiple computing devices (nodes) that are physically and/or logically connected into clusters. Respective nodes in a NAS cluster can further be configured such that each node enables access (e.g., by a client) to all data stored on the platform.

The distributed nature of NAS systems can enable such system to be highly scalable, thereby providing a shared storage space for potentially large numbers of users. However, as the number of users of an NAS system increases, the possibility for one or more malicious users intentionally or unintentionally attempting to inject malware onto the system storage also increases. For instance, a malicious user may inject malware intentionally to infect the system, or an innocent user may do so unknowingly, e.g., by writing files which have been copied from an infected storage source onto the system.

When a virus or other malware is detected in an NAS system, spread of the malware can be stopped by, e.g., deleting, truncating, or quarantining the infected file, blocking access to the infected file by system users, and/or by other means. In addition to these actions, various aspects herein provide techniques by which users that are responsible for injecting malware onto the shared storage can be identified. This can provide significant benefits to system administrators, who conventionally can only collect this data via scanning and/or tracing audit logs across long time durations via cumbersome, lengthy, and error-prone processes.

Various aspects described herein relate to techniques by which an NAS system can identify malicious users and/or other users who have written one or more infected files to the storage in the past. This can, in turn, aid administrators and/or the system in taking preventative measures against such users. These measures can include, but are not limited to:

1) Observing the activities of a malicious user in a system cluster

2) Enabling system alerts pertaining to respective users in addition to malware detection alerts 3) Real-time and/or forced scanning of files modified by such users 4) Moving malicious users to a less privileged group and/or otherwise limiting read/write access to the storage by the malicious users 5) Running scheduled scan jobs for only files modified by such users Other actions are also possible. Various ways in which the above and/or other actions can be triggered and/or performed are described in further detail below.

By identifying malicious users on an NAS system and/or performing one or more preventative actions as set forth above and/or described below, an NAS system can be better protected from further possible damage or infection caused by malicious users. For instance, in a system that utilizes scheduled malware scanning, various techniques provided herein can reduce the amount of time that malware can reside on the storage until the scheduled scan is triggered, thereby reducing the operable window where the malicious user(s) have write permissions to continue injecting malware onto the system.

Various aspects as described below can provide advantages that can improve the performance of an NAS system and/or its associated computing devices. These advantages can include, but are not limited to, the following. Security of an NAS system and/or information stored on the system can be made more secure by identifying new and habitual malicious users, as well as by implementing granular controls on the actions of a potential malicious user on the storage. Information pertaining to malware infections and/or malicious users can be made readily available to an administrator without the administrator going through the cumbersome and potentially error-prone process of searching system audit logs. Actions can be performed in response to malware infections and/or malicious users based on automated processes using system data on a scale that could not be analyzed by a human in a useful or reasonable timeframe. System resource usage (e.g., in terms of network bandwidth, power consumption, processing cycles, etc.) associated with malware scanning and/or associated damage control can be reduced. Security and integrity of files or other data stored on an NAS system can be improved. Other advantages could also be realized.

With reference now to the drawings, FIG. 1 illustrates a system 100 that facilitates identification and control of malicious users on a data storage system in accordance with various aspects described herein. As shown in FIG. 1, system 100 includes a file tracking component 110 that can record identities (e.g., numerical user identifiers or IDs, system usernames or handles, etc.) of users that have made at least one modification to a file stored on an NAS system and/or another suitable data storage system. As used herein, the term "modification" refers to any action taken by a user that results in a change to the information stored by the data storage system. This can include, e.g., creating (writing, copying, etc.) a file, editing a file, deleting a file, and/or any other suitable action(s). In an aspect, recording as performed by the file tracking component 110 can result in a set of recorded users. Techniques for generating a set of recorded users for a given file are described in more detail below with respect to FIGS. 2-3.

System 100 further includes a user monitor component 120 that can increment respective malware counts associated with respective users in the set of recorded users generated by the file tracking component 110 in response to a malware scan of the file indicating that the file contains malware. Techniques for directing a malware scan of a file are described in further detail below with respect to, e.g., FIGS. 2-3. Additionally, techniques for incrementing and utilizing malware counts for respective users are described below with respect to FIGS. 4-5.

As further shown in FIG. 1, system 100 also includes an access control component 130 that can restrict usage of the data storage system by a first user of the set of recorded users generated by the file tracking component in response to determining that the first user is a malicious user, e.g., based on a malware count associated with the first user being above a given threshold. In an aspect, the access control component 130 can restrict usage of the data storage system by performing actions that can include, but are not limited to, restricting write access by a given user to some or all of the data storage system, revoking access by a given user to some or all of the data storage system, and/or other suitable actions. Techniques for defining and performing restrictive actions on a malicious user are described in further detail below with respect to FIGS. 6-7.

Figure 2:
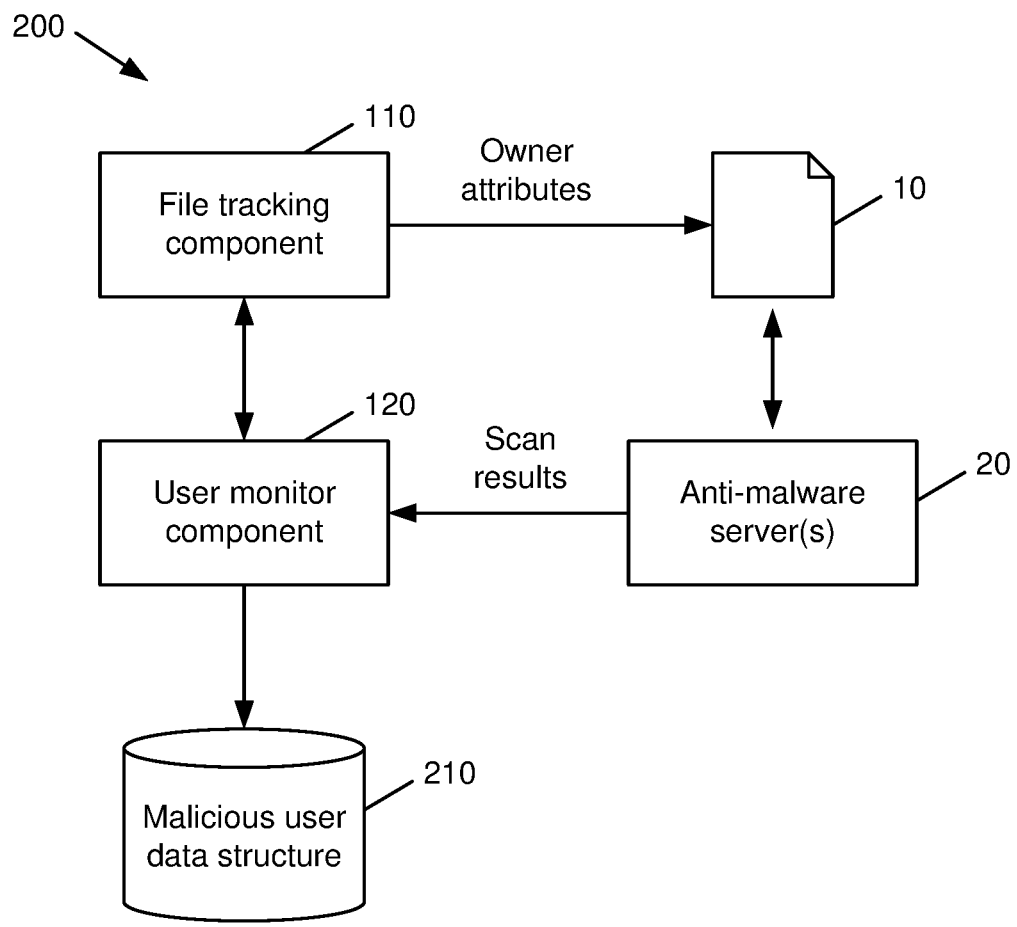
FIG. 2 is a block diagram of a system that facilitates maintaining data relating to malicious users associated with a data storage system in accordance with various aspects described herein.

Turning next to FIG. 2, a block diagram of a system 200 that facilitates maintaining data relating to malicious users associated with a data storage system in accordance with various aspects described herein is illustrated. Repetitive description of like elements employed in other embodiments described herein is omitted for brevity. As shown in FIG. 2, system 200 includes a file tracking component 110 and a user monitor component 120, which can operate in a similar manner as that described with respect to FIG. 1. In an aspect, the file tracking component 110 can maintain a set of modifying users for a given file 10 as clients and/or other users create and/or modify the file 10. In one example, the file tracking component 110 can maintain a set of modifying users for the file 10 within the file 10 itself, e.g., in an attribute of the file 10. For instance, attribute data associated with the file 10 can be extended to include an owner field. For the purposes of this description, the term "owner" is used only to refer to a client or other user that makes modifications to the file 10 and is not intended to represent or imply other properties, such as read/write permissions or the like.

In an aspect, the file 10 can be provided to an external anti-malware server 20, such as an antivirus server (AVS) or the like, for malware scanning. The anti-malware server 20 can perform a malware scan of the file 10 according to one or more scan configurations. These configurations can include, but are not limited to, the following:

1. Scheduled Scan: Scanning of one or more files is triggered at a predetermined time, e.g., using a job engine associated with the data storage system.

2. Forced Scan: A system administrator can choose to scan a file forcefully at any given time.

3. Real time scan: Real time scanning can be performed via scan on write/close or scan on read/open.

a. Scan on Write/Close: A scan is performed when a user writes a new file or modifies an existing file and closes it.

b. Scan on Read/Open: A scan is performed on a file when a user tries to read or open it.

In response to performing a scan on the file 10 according to one or more of the above techniques, the external anti-malware server 20 can report a result of the scan to the user monitor component 120. If the scan performed by the anti-malware server 20 indicates that the file 10 is clean, i.e., does not contain malware, the user monitor component 120 can cause the file tracking component to clear the set of recorded users for the file 10. Otherwise, if the scan of the file 10 indicates that the file 10 does contain malware, the user monitor component 120 can add respective ones of the owners of the file 10 to a malicious user data structure 210 for potential restrictive action. Creation and maintenance of the malicious user data structure 210 is described in further detail with respect to FIGS. 4-5.

Figure 3:
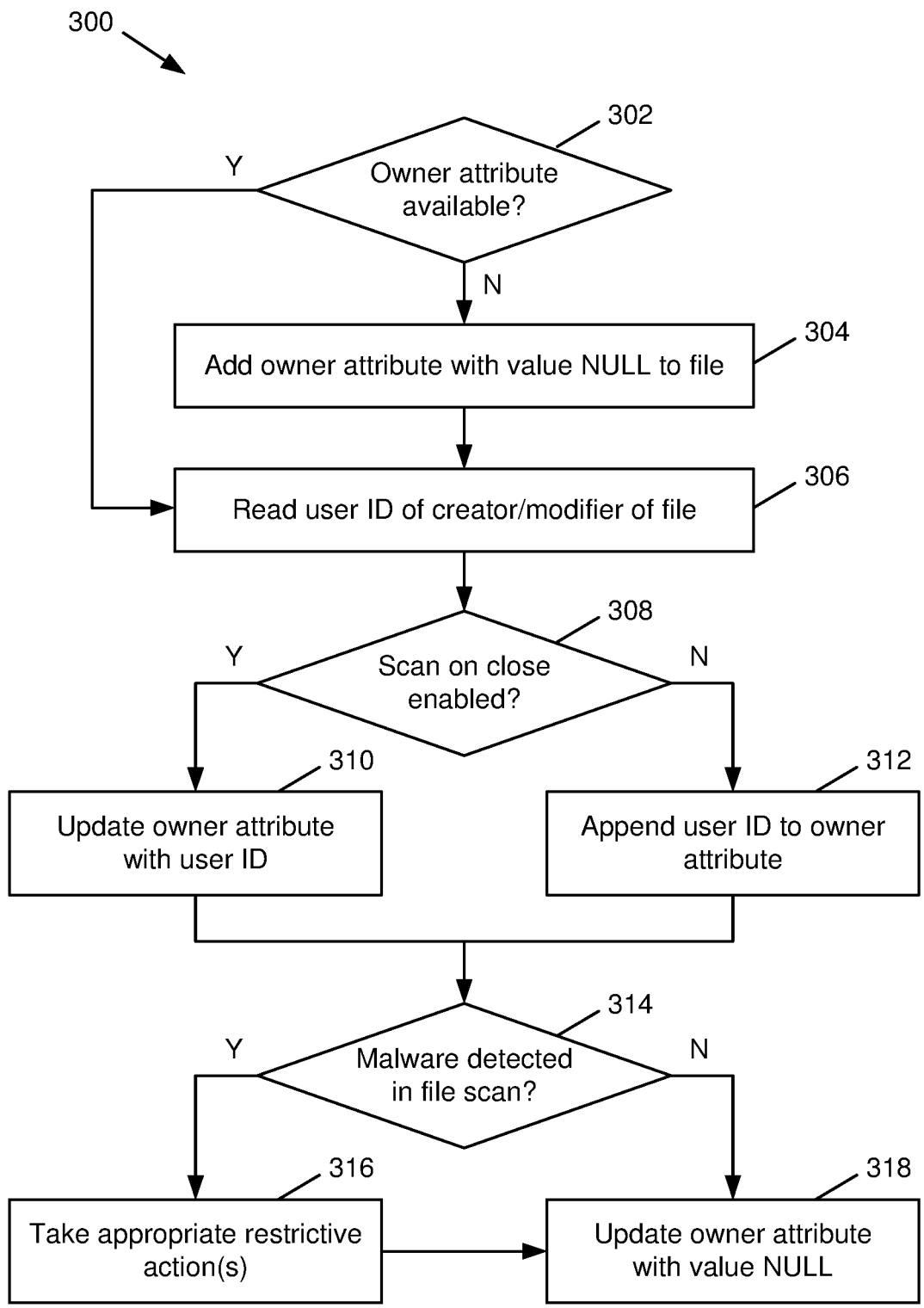
FIG. 3 is a flow diagram of a method that facilitates storing information relating to users who modify files stored on a data storage system in accordance with various aspects described herein.

Turning now to FIG. 3, a flow diagram of an example method 300 for storing information relating to users who modify files stored on a data storage system in accordance with various aspects described herein is illustrated. In an aspect, method 300 can be utilized when a file is created and/or modified to save information relating to the user(s) who have written or modified the file. While respective actions taken in method 300 as described below relate to user IDs, it should be appreciated that other user-related information, such as usernames or handles, could also be used. Further, while the actions described below relate to a single file for simplicity of explanation, it should be appreciated that multiple files could be processed in a similar manner to that described below.

At 302, it is determined (e.g., by the file tracking component 110) whether an owner attribute is available for a given file. For instance, the file tracking component 110 can determine whether an extended attribute owner_since_last-_scan is available for the file. If such an attribute is not available, method 300 can proceed to 304, where an owner attribute with value NULL is added to the file.

After adding the owner attribute at 304, or in response to determining that the owner attribute for the file is available at 302, method 300 can proceed to 306, at which the user ID of the creator and/or modifier of the file is read (e.g., by the user monitor component 120) from the attribute information for the file.

At 308, if scan on close is enabled (e.g., as described above with respect to FIG. 2), method 300 can proceed to 310, where the owner attribute of the file can be updated (e.g., by the user monitor component 120) with the user ID read at 306. Otherwise, method 300 can proceed to 312, where the user ID read at 306 can be appended (e.g., by the user monitor component 120) to the owner attribute for the file.

After the actions performed at 310 and/or 312, a malware scan of the file can be performed, e.g., by an external anti-malware server 20. Once the scan has concluded, method 300 can proceed to 314 to determine whether malware was detected in the file scan. If malware was detected in the file scan, method 300 can proceed to 316, wherein one or more appropriate restrictive actions can be taken, such as recording the user ID read at 306 to the malicious user data structure 210 and/or enforcing a suitable damage control policy as described below with respect to FIGS. 6-7. Upon completion of the restrictive action(s) at 316, or upon determining at 314 that the file does not contain malware, method 300 can conclude at 318 by clearing (e.g., by the file tracking component 110) the owner attribute of the file by updating the owner attribute with value NULL.

Figure 4:
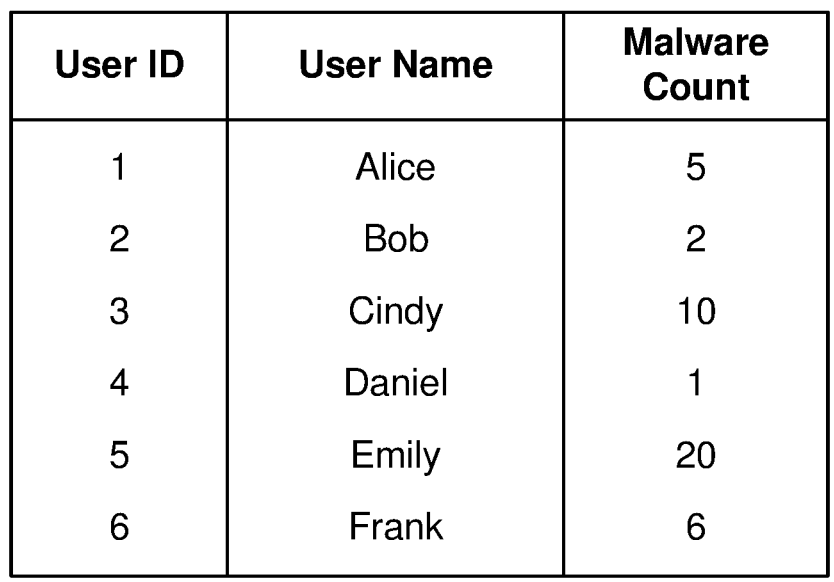
FIG. 4 is a diagram depicting an example structure for a malicious user data structure that can be used in accordance with various aspects described herein.

With reference next to FIG. 4, a diagram 400 depicting an example structure for the malicious user data structure 210 that can be used in accordance with various aspects described herein is illustrated. As shown by diagram 400, the malicious user data structure 210 can include records for respective users that include a numerical user ID, a user name, and a malware count. While first names are utilized for the user name filed in diagram 400, it should be appreciated that any suitable user identifier, such as a system username, could also be used. It should further be appreciated that additional information could also be stored in the malicious user data structure 210 in addition to, or in place of, the information shown in diagram 400. Additionally, while diagram 400 illustrates the malicious user data structure 210 in a tabular format, the malicious user data structure 210 could be structured in any suitable format such as, e.g., a list or linked list, a tree structure, a database, and/or any other suitable structure.

In an aspect, malware count field of the malicious user data structure 210 as illustrated by diagram 400 can be an indication of the number of malware infections that have been associated with the corresponding user. In one example, the malware count for a given user can be incremented in response to a file having the user as a listed owner being determined to contain malware in a file scan. In another example, entries and/or malware counts associated with the malicious user data structure 210 can be modified and/or reset by a system administrator, e.g., after taking appropriate action(s) or conducting due diligence. In an aspect, the malicious user data structure 210 can be associated with one or more nodes of a file storage system, or a single data structure can be shared by all nodes of the system.

The malware counts associated with respective users in the malicious user data structure 210, e.g., as illustrated by diagram 400, can be based on a number of infected files that are associated with a given user and/or a number of infections. For instance, if a single file is modified by the same user multiple times, the malware count for that user can be incremented by the number of scans indicating that the file has been infected, which in some cases can be greater than 1.

In an aspect, the malicious user data structure 210 can contain information relating to only users of the data storage system having a malware count of greater than zero. Thus, the first time a given user is associated (e.g., as an owner) with a file that is infected with malware, that user can be added to the malicious user data structure 210 with an appropriate malware count. Other techniques for organizing users with respect to the malicious user data structure 210 could also be used.

Figure 5:
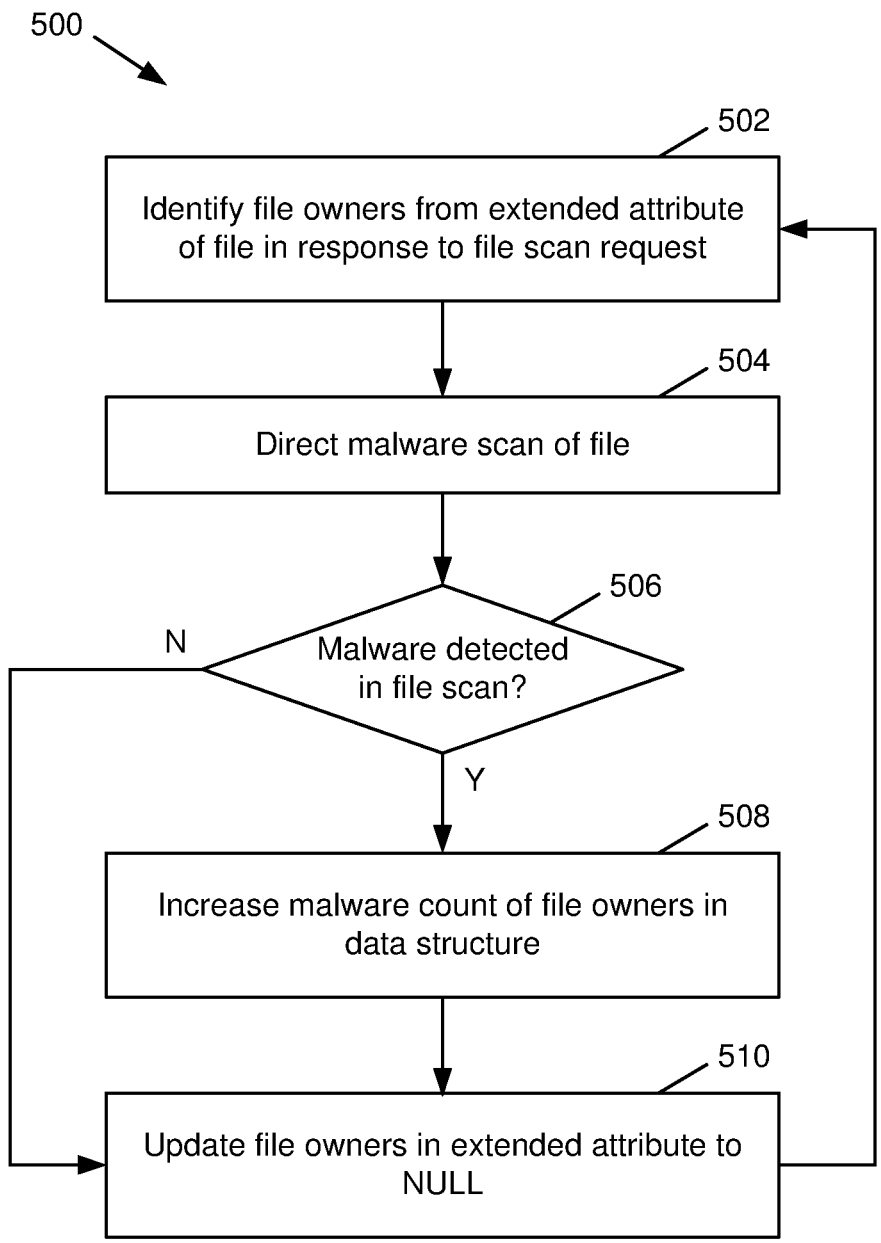
FIG. 5 is a flow diagram of a method that facilitates identifying and accounting malicious users in accordance with various aspects described herein.

With reference now to FIG. 5, illustrated is a flow diagram of a method 500 for identifying and accounting malicious users associated with a file in a data storage system. While method 500 is described with respect to a single file for ease of explanation, it should be appreciated that multiple files could be processed in a similar manner Method 500 begins at 502, where the owners of a file are identified, e.g., via the file tracking component 110 by reading the owner_since_last_scan attribute of the file as utilized in method 300, in response to initiation of a file scan request.

At 504, a malware scan of the file (e.g., by an antimalware server 20) is directed. In response to completion of the malware scan, at 506, it is determined whether malware was detected in the malware scan. If malware was detected in the scan, method 500 can proceed to 508, where the malware count(s) corresponding to the owner(s) of the file as identified at 502 are incremented (e.g., by the user monitor component 120) in the malicious user data structure 210.

After incrementing the malware count(s) for the file owner(s) at 508, or in response to determining at 506 that the file does not contain malware, method 500 can proceed to 510, where the file owner attribute for the file is cleared, e.g., the value of owner_since_last_scan is set to NULL. Method 500 can then return to 502 for further processing of other files as appropriate.

Figure 6:
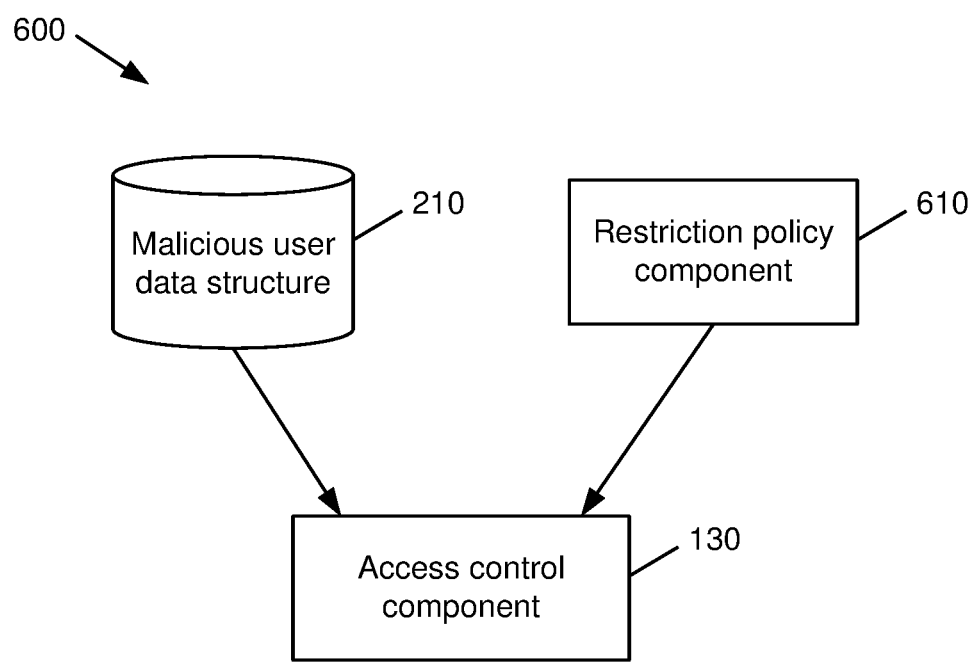
FIG. 6 is a block diagram of a system that facilitates imposing access restrictions on malicious users associated with a data storage system in accordance with various aspects described herein.

Turning now to FIG. 6, a block diagram of a system 600 that facilitates imposing access restrictions on malicious users associated with a data storage system in accordance with various aspects described herein is illustrated. Repetitive description of like elements employed in other embodiments described herein is omitted for brevity. System 600 as shown in FIG. 6 includes an access control component 130 that can perform one or more restrictive actions with respect to users indicated in the malicious user data structure 210. System 600 further includes a restriction policy component 610 that can define damage control policies to configure the actions that can be taken by the access control component 130 in various cases. In an aspect, the restriction policy component 610 can associate respective actions of a set of restrictive actions with corresponding malware count thresholds.

A structure of example damage control policies that can be utilized by the restriction policy component 610 and the access control component 130 is shown by diagram 700 in FIG. 7. The damage control policies shown by diagram 700 can be stored and/or accessed in any suitable manner. For instance, the damage control policy can be stored as a data structure (e.g., a table, database, linked list, etc.) that can be part of, or separate from, the malicious user data structure 210. Other implementations can also be used.

In an aspect, the damage control policies utilized by the restriction policy component 610 can be preconfigured with the data storage system, or alternatively the damage control policy can be set and/or modified by a system administrator. As shown by diagram 700, the damage control policies can include respective policies that are enforced when the malware count of a given user passes a corresponding threshold. For instance, diagram 700 illustrates that future writes by the user can be scanned for the next 24 hours at a malware count of 1, write permissions to one share in the system by the user can be revoked for 12 hours at a malware count of 4, and so on. As used here, a "share" refers to a set of files stored by the data storage system that can be exposed to a client via one or more protocols. For instance, a share can be and/or include a server message block (SMB) share, a network node, a segment of the file system of the data storage system divided in any suitable manner, etc. While diagram 700 illustrates specific, non-limiting examples of malware counts and corresponding policies, it should be appreciated that the damage control policies can be configured in any suitable manner.

As additionally shown in diagram 700, each damage control policy can be associated with a corresponding damage control policy code. In an aspect, the malicious user data structure 210 can be extended to include the damage control policy code associated with each user, as shown by diagram 800 in FIG. 8. It should be appreciated, however, that the damage control policy code need not be explicitly present in the malicious user data structure 210. For instance, the damage control policy code could be implied from the malware count of a given user.

In an aspect, damage control policies defined by the restriction policy component 610 and/or enforced by the access control component 130 can be configured to escalate as a user malware count increases. For example, the access control component 130 can restrict usage of the data storage system by a user that exceeds a first malware count threshold by applying a first restrictive action, e.g., as defined by the damage control policies, that is associated with that threshold. As the malware count associated with the user increases and exceeds further thresholds, more severe damage control policies can be applied. By way of example, the first restrictive action as described above can be associated with a first time length (e.g., 12 hours), and in response to the malware count for a user exceeding a second, higher threshold, the access control component 130 can restrict usage of the data storage system by the user by applying a second restrictive action, e.g., as defined by the damage control policies, that is associated with a second time length (e.g., 24 hours or greater) that is longer than the first time length.

Also or alternatively, respective damage control policies can escalate in terms of severity of restriction. For instance, the damage control policies illustrated by diagram 700 show that write access can be revoked to a user in response to that user exceeding a first malware count threshold (e.g., 4, as shown in diagram 700), which can escalate to revocation of read access and, ultimately, all access to the file storage system as the malware count of the user exceeds other, progressively larger thresholds. Other schemes for assigning and enforcing damage control policies can also be used.

In an aspect, a malware count associated with a user can be reduced and/or otherwise modified by the user monitor component 120 under various conditions. For instance, the user monitor component 120 can reduce the malware count associated with a user subsequent to expiration of the time length associated with a damage control policy enforced on the user. This can occur automatically after expiration of the policy's enforcement or later, e.g., upon an administrator's approval.

Figure 9:
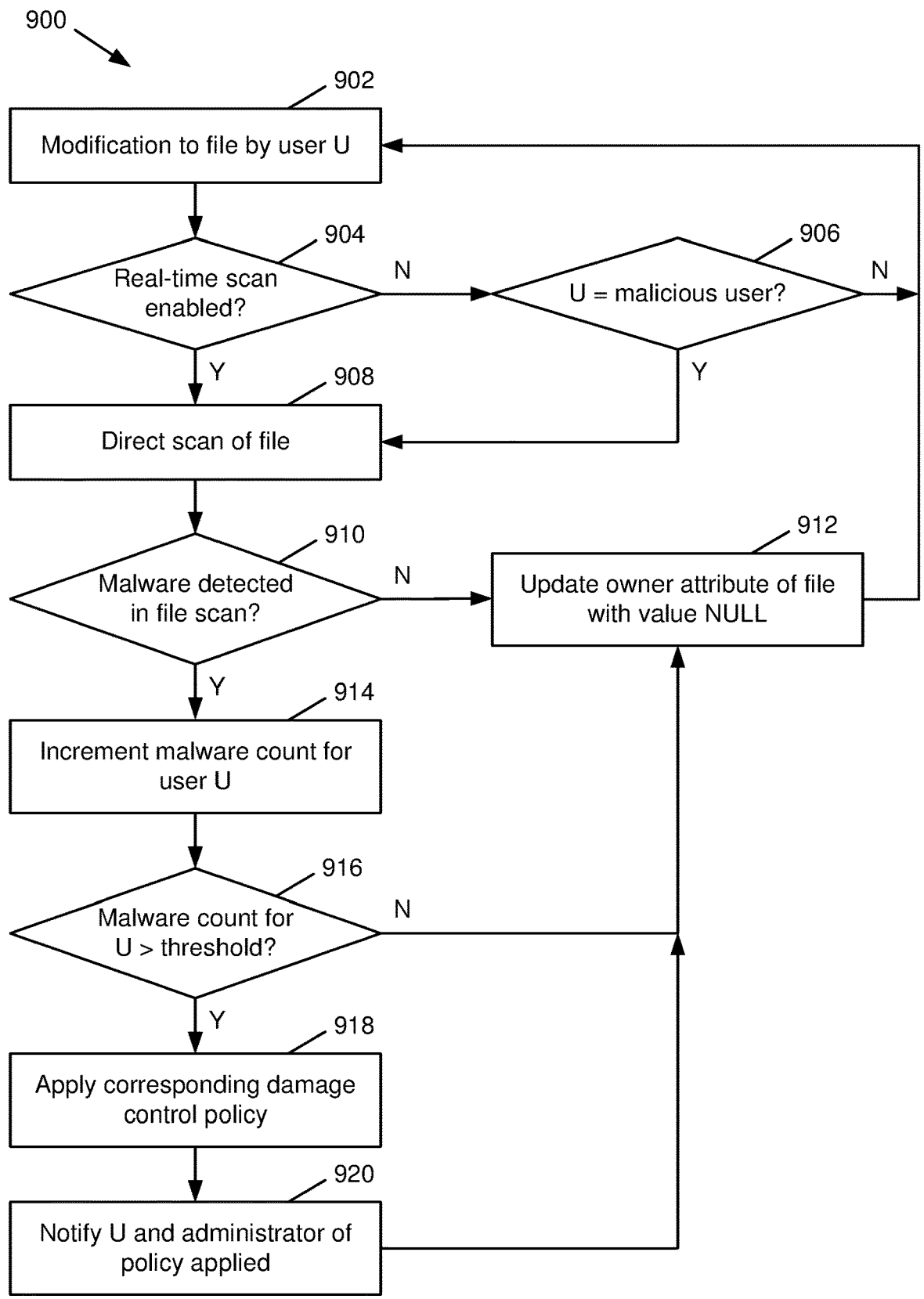
FIGS. 9-11 are flow diagrams of respective methods that facilitate automatic restrictive actions on malicious users in a data storage system in accordance with various aspects described herein.

Turning now to FIG. 9, a flow diagram of a method 900 that facilitates automatic restrictive actions on malicious users in a data storage system in accordance with various aspects described herein is illustrated. In particular, method 900 can be utilized by the access control component 130 and/or other suitable components of a data storage system to apply and/or enforce restrictive actions on a user in association with real time file scans.

Method 900 begins at 902, where a user U writes or modifies a file. At 904, if real time scanning is not enabled, method 900 proceeds to 906 to check whether U is a malicious user, e.g., U appears in the malicious user data structure 210. If real time scanning is not enabled, and U is not a malicious user, method 900 returns to 902 to process additional files.

If real time scanning is enabled at 904, or if U is determined to be a malicious user at 906, method 900 proceeds to 908, where a malware scan of the file (e.g., by an anti-malware server 20) is directed or otherwise performed.

Upon conclusion of the malware scan, method 900 proceeds to 910, where it is determined whether malware was detected in the file scan. If no malware was detected, method 900 proceeds to 912, where the owner attribute for the file is cleared, e.g., the owner_since_last_scan attribute of the file is set to value NULL as described above with respect to FIGS. 3 and 5. Method 900 can then return to 902 for processing of additional files.

If malware was detected in the file scan at 910, method 900 can proceed to 914, where a malware count for U is incremented, e.g., in the malicious user data structure 210. At 916, if incrementing the malware count for U causes that malware count to exceed a threshold associated with a damage control policy, e.g., a damage control policy as defined by the restriction policy component 610 and/or as shown in diagram 700, the corresponding damage control policy is applied to user U at 918. At 920, user U and a system administrator are notified regarding the policy applied at 918. Upon application of the policy at 918-920, or in response to the malware count for U not exceeding a threshold at 916, method 900 returns to 912 to clear the owner attribute of the file and then to 902 for processing of additional files.

Figure 10:
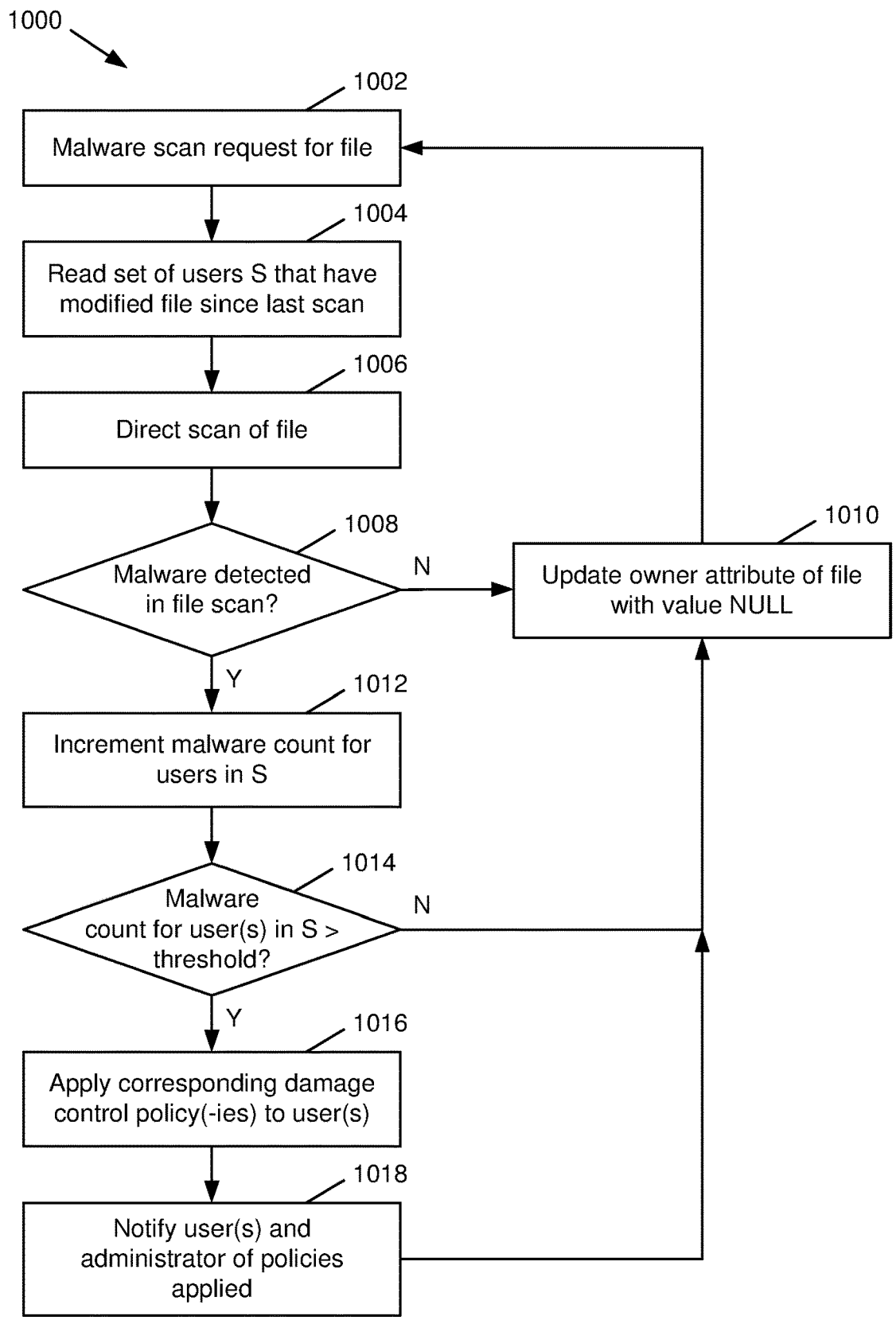

With reference next to FIG. 10, a flow diagram of a method 1000 that facilitates automatic restrictive actions on malicious users in a data storage system in accordance with various aspects described herein is illustrated. In particular, method 1000 can be utilized by the access control component 130 and/or other suitable components of a data storage system to apply and/or enforce restrictive actions on a user in association with scheduled file scans.

At 1002, a malware scan request is initiated for a file residing on the data storage system. Next, at 1004, the user IDs, names, and/or other information pertaining to a set S of users that have modified the file since its last scan are read, e.g., from an owner_since_last_scan attribute and/or other suitable information sources.

At 1006, a malware scan of the file is directed and/or performed (e.g., by an anti-malware server 20). In a system utilizing scheduled malware scans, this can occur at a scheduled time and/or another suitable time, such as a time set by an administrator.

Upon conclusion of the malware scan, method 1000 proceeds to 1008, where it is determined whether malware was detected in the file scan. If no malware was detected, method 1000 proceeds to 1010, where the owner attribute for the file is cleared, e.g., the owner_since_last_scan attribute of the file is set to value NULL in a similar manner to that described above with respect to 912 in method 900. Method 1000 can then return to 1002 for processing of additional files.

If malware was detected in the file scan at 1008, method 1000 can proceed to 1012, where malware counts for respective users in set S are incremented, e.g., in the malicious user data structure 210. At 1014, if incrementing the malware count for the users in set S causes a malware count for at least one user in S to exceed a threshold associated with a damage control policy, e.g., a damage control policy as defined by the restriction policy component 610 and/or as shown in diagram 700, the corresponding damage control policy/policies can be applied to the corresponding users at 1016. At 1018, the users for which damage control policies were applied at 1016, as well as a system administrator, are notified regarding the policy/policies applied at 1016. Upon application of the policy at 1016-1018, or in response to the malware count for no users in S exceeding a threshold at 1014, method 1000 returns to 1010 to clear the owner attribute of the file and then to 1002 for processing of additional files.

Figure 11:
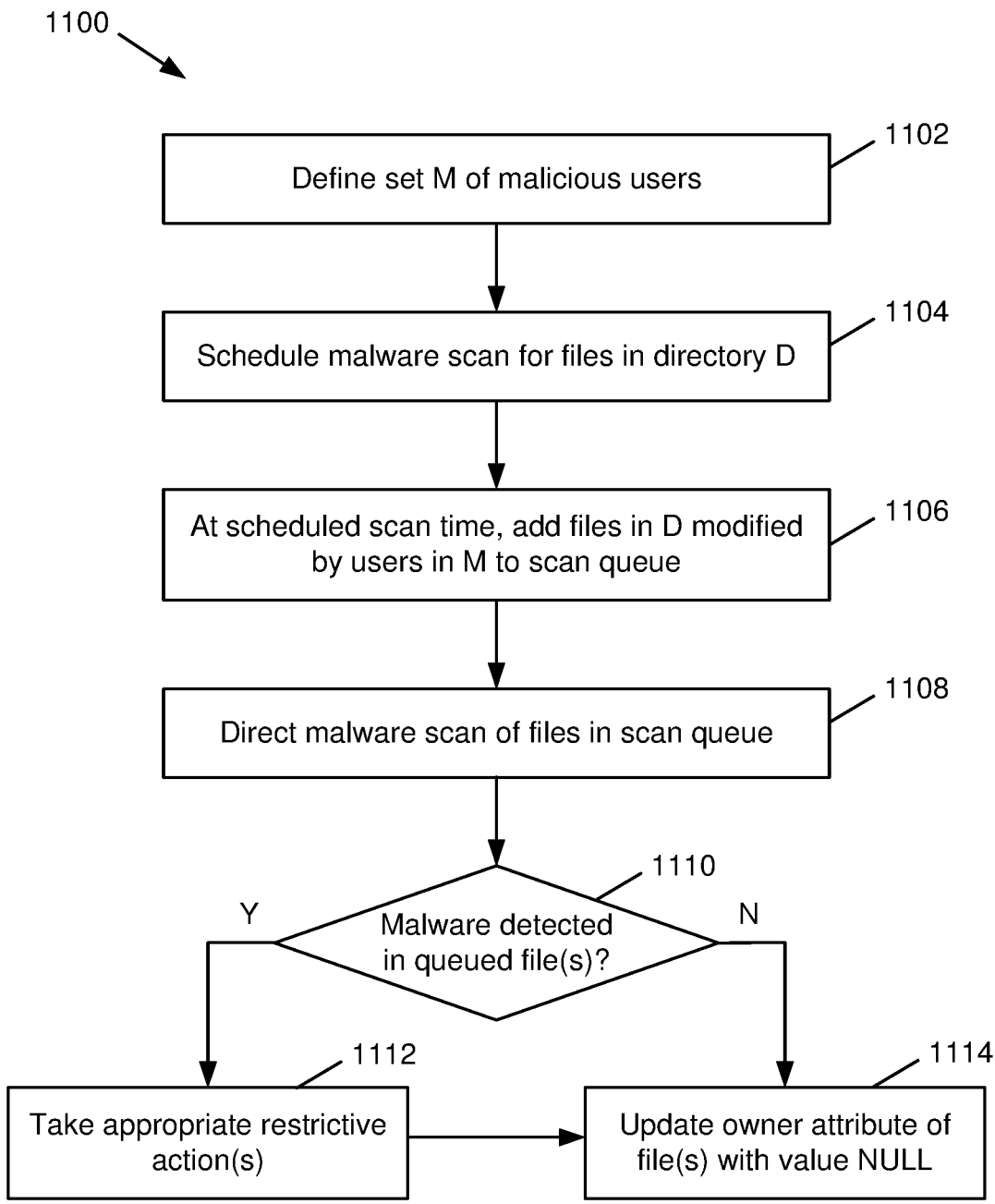

FIG. 11 illustrates a flow diagram of another method 1100 that facilitates automatic restrictive actions on malicious users in a data storage system in accordance with various aspects described herein. In particular, method 1100 can be utilized by the access control component 130 and/or other suitable components of a data storage system to periodically scan files that have been modified by identified malicious users.

At 1102, a set M of malicious users can be identified. In an aspect, the set M can contain the user IDs and/or other identifiers of users that have injected malware onto the file storage system in the past. This can be a global set of malicious users, e.g., as given by the malicious user data structure 210, or a custom set, e.g., a set containing one or more users as defined by an administrator.

When the scheduled scan time arrives, method 1100 can proceed to 1106, wherein respective files in directory D that have been modified by users in set M can be added to a scan queue for the scan job. In an aspect, files can be added to the scan queue (e.g., by the user monitor component 120) by examining the respective files in directory D. For instance, for each file in directory D, if an owner attribute of the file is available, not NULL, and includes at least one user in set M, the file can be added to the scan queue.

At 1108, a malware scan of the files added to the scan queue at 1106 is directed and/or otherwise performed. At 1110, if malware was detected in any of the queued files by the scan at 1108, method 1100 can proceed to 1112, where one or more restrictive actions can be performed as appropriate in various manners as described above. Upon completion of the restrictive action(s) at 1112, or in response to no malware being detected at 1110, method 1100 can conclude at 1114, where the owner attribute of the file(s) scanned at 1108 is cleared, e.g., set to NULL.

Figure 12:
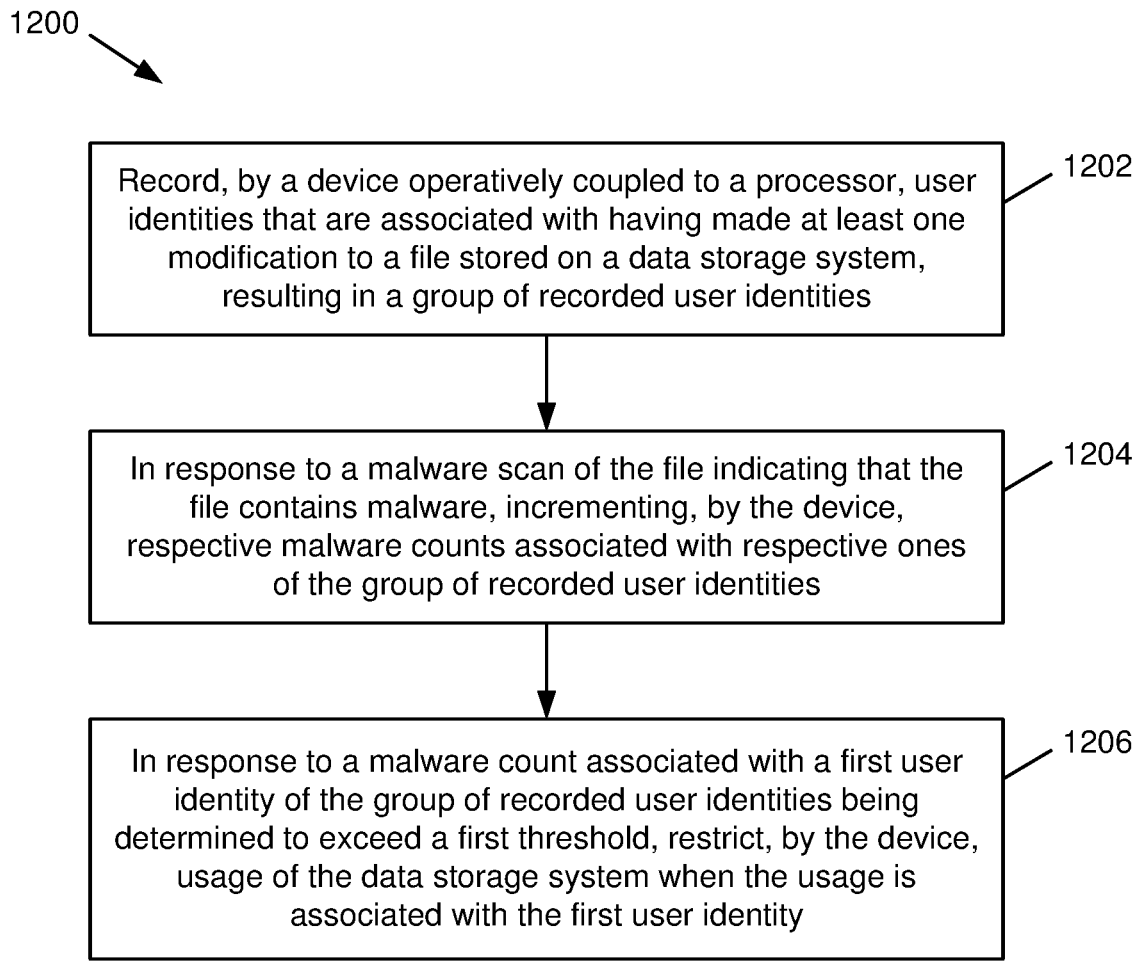
FIG. 12 is a flow diagram of a method that facilitates identification and control of malicious users on a data storage system in accordance with various aspects described herein.

With reference now to FIG. 12, presented is a flow diagram of a method 1200 that facilitates identification and control of malicious users on a data storage system in accordance with various aspects described herein. At 1202, a device operatively coupled to a processor can record (e.g., by a file tracking component 110) user identities (usernames, numerical identifiers, etc.) that are associated with having made at least one modification to a file stored on a data storage system, resulting in a group of recorded user identities.

At 1204, in response to a malware scan of the file indicating that the file contains malware, the device can increment (e.g., by a user monitor component 120) respective malware counts associated with respective ones of the group of recorded user identities (e.g., as stored in a malicious user data structure 210).

At 1206, in response to a malware count associated with a first user identity of the group of recorded user identities being determined to exceed a first threshold after incrementing the malware counts at 1204, the device can restrict (e.g., by an access control component 130) usage of the data storage system when that usage is associated with the first user identity. Stated another way, the device can restrict usage of the data storage system by the user corresponding to the first user identity.

FIGS. 3, 5, and 9-12 as described above illustrate respective methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 13:
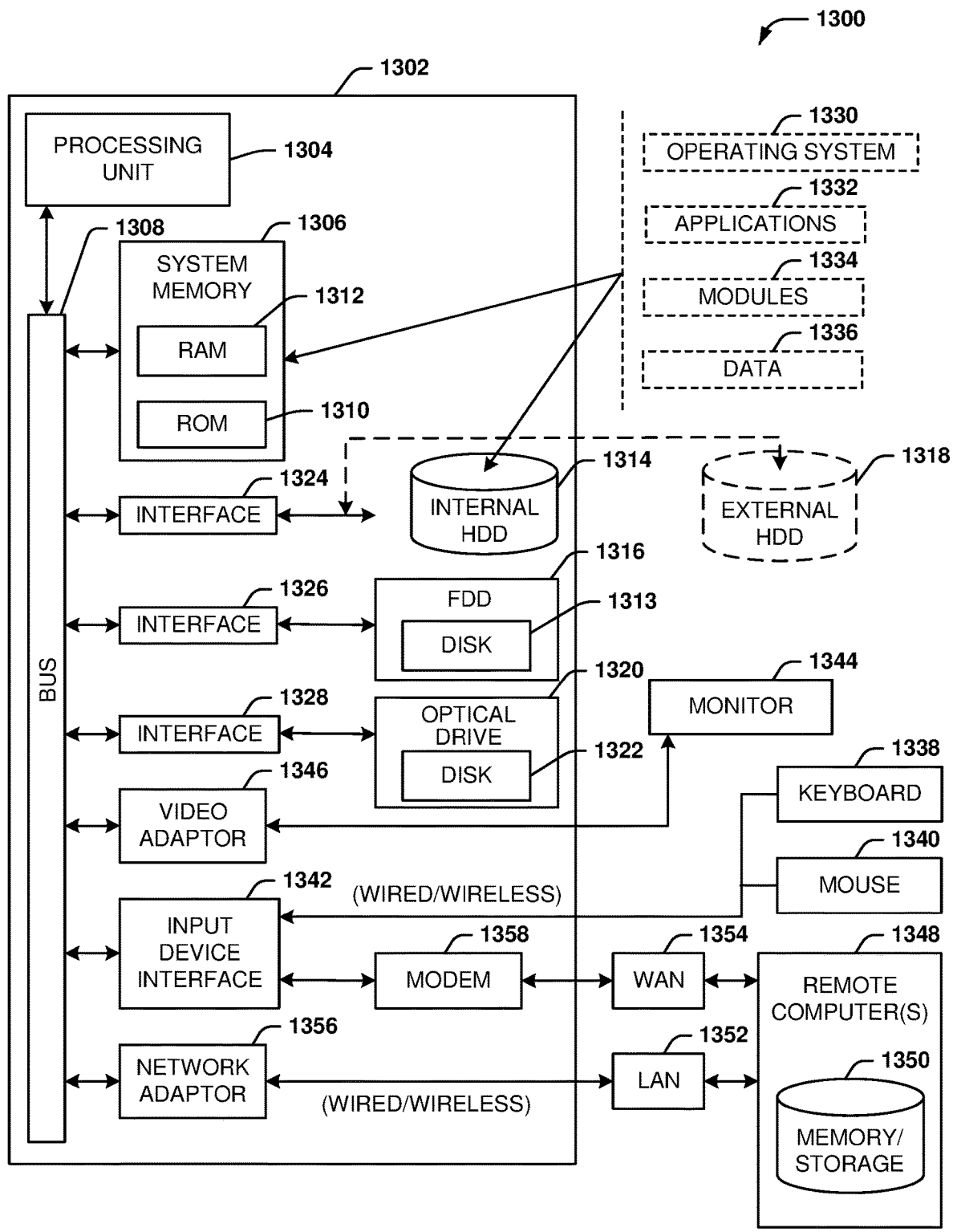
FIG. 13 is a diagram of an example computing environment in which various embodiments described herein can function.

In order to provide additional context for various embodiments described herein, FIG. 13 and the following discussion are intended to provide a brief, general description of a suitable computing environment 1300 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 13, the example environment 1300 for implementing various embodiments of the aspects described herein includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures can also be employed as the processing unit 1304.

The system bus 1308 can be any of several types of bus structure that can further interconnect to a memory bus (with or without a memory controller), a peripheral bus, and a local bus using any of a variety of commercially available bus architectures. The system memory 1306 includes ROM 1310 and RAM 1312. A basic input/output system (BIOS) can be stored in a non-volatile memory such as ROM, erasable programmable read only memory (EPROM), EEPROM, which BIOS contains the basic routines that help to transfer information between elements within the computer 1302, such as during startup. The RAM 1312 can also include a high-speed RAM such as static RAM for caching data.

The computer 1302 further includes an internal hard disk drive (HDD) 1314 (e.g., EIDE, SATA), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). While the internal HDD 1314 is illustrated as located within the computer 1302, the internal HDD 1314 can also be configured for external use in a suitable chassis (not shown). The HDD 1314, magnetic FDD 1316 and optical disk drive 1320 can be connected to the system bus 1308 by an HDD interface 1324, a magnetic disk drive interface 1326 and an optical drive interface 1328, respectively. The interface 1324 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1302, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. The systems and methods described herein can be implemented utilizing various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) can include a microphone, an infrared (IR) remote control, a joystick, a game pad, a stylus pen, touch screen or the like. These and other input devices are often connected to the processing unit 1304 through an input device interface 1342 that can be coupled to the system bus 1308, but can be connected by other interfaces, such as a parallel port, an IEEE 1394 serial port, a game port, a USB port, an IR interface, etc.

A monitor 1344 or other type of display device can be also connected to the system bus 1308 via an interface, such as a video adapter 1346. In addition to the monitor 1344, a computer typically includes other peripheral output devices (not shown), such as speakers, printers, etc.

The computer 1302 can operate in a networked environment using logical connections via wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which can connect to a global communications network, e.g., the Internet.

When used in a LAN networking environment, the computer 1302 can be connected to the local network 1352 through a wired and/or wireless communication network interface or adapter 1356. The adapter 1356 can facilitate wired or wireless communication to the LAN 1352, which can also include a wireless access point (AP) disposed thereon for communicating with the wireless adapter 1356.

When used in a WAN networking environment, the computer 1302 can include a modem 1358 or can be connected to a communications server on the WAN 1354 or has other means for establishing communications over the WAN 1354, such as by way of the Internet. The modem 1358, which can be internal or external and a wired or wireless device, can be connected to the system bus 1308 via the input device interface 1342. In a networked environment, program modules depicted relative to the computer 1302 or portions thereof, can be stored in the remote memory/storage device 1350. It will be appreciated that the network connections shown are example and other means of establishing a communications link between the computers can be used.

The computer 1302 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
    a memory that stores computer executable components; and
    a processor that executes computer executable components stored in the memory, wherein the computer executable components comprise:
        a file tracking component that records identities of users that have made at least one modification to a file stored on the data storage system, resulting in a set of recorded users;
        a user monitor component that increments respective malware counts stored in respective records of a data structure, each of the respective records being uniquely associated with respective corresponding users of the set of recorded users, in response to a malware scan of the file indicating that the file contains malware, resulting in respective incremented malware counts; and
        an access control component that restricts usage of the data storage system by a first user of the set of recorded users in response to a malware count of the respective incremented malware counts stored in a record of the data structure that is uniquely associated with the first user exceeding a first threshold;
        wherein the file tracking component clears the set of recorded users in response to the malware scan of the file indicating that the file does not contain malware.

2. The data storage system of claim 1, wherein the computer executable components further comprise:
    a restriction policy component that associates respective actions of a set of restrictive actions with respectively corresponding malware count thresholds that include the first threshold.

3. The data storage system of claim 2, wherein the access control component restricts the usage of the data storage system by the first user by applying a first restrictive action of the set of restrictive actions that is associated with the first threshold.

4. The data storage system of claim 3, wherein the first restrictive action is associated with a first time length.

5. The data storage system of claim 4, wherein, in response to the malware count associated with the first user exceeding a second threshold that is greater than the first threshold, the access control component restricts the usage of the data storage system by the first user by applying a second restrictive action of the set of restrictive actions, the second restrictive action being associated with a second time length that is longer than the first time length.

6. The data storage system of claim 4, wherein the user monitor component reduces the malware count associated with the first user subsequent to expiration of the first time length.

7. The data storage system of claim 1, wherein the access control component restricts the usage of the data storage system by the first user by restricting write access to the data storage system by the first user.

8. The data storage system of claim 1, wherein the access control component restricts the usage of the data storage system by the first user by revoking access to the data storage system by the first user.

9. The data storage system of claim 1, wherein the file tracking component records the identities of the users in an attribute of the file.

10. A method, comprising:
- recording, by a device operatively coupled to a processor, user identities that are associated with having made at least one modification to a file stored on a data storage system, resulting in a group of recorded user identities;
- in response to a malware scan of the file indicating that the file contains malware, incrementing, by the device, respective malware counts stored in respective records of a data structure, wherein each of the respective records are uniquely associated with respective corresponding ones of the group of recorded user identities, resulting in respective incremented malware counts;
- in response to a malware count of the respective incremented malware counts stored in a record of the data structure that is uniquely associated with a first user identity of the group of recorded user identities being determined to exceed a first threshold, restricting, by the device, usage of the data storage system when the usage is associated with the first user identity; and
- in response to the malware scan of the file indicating that the file does not contain malware, clearing, by the device, the group of recorded user identities.

11. The method of claim 10, wherein the restricting comprises:
- performing a first restrictive action with respect to the first user identity, the first restrictive action being associated with a first time length; and
- performing a second restrictive action with respect to the first user identity in response to the malware count associated with the first user identity being determined to exceed a second threshold that is greater than the first threshold, the second restrictive action being associated with a second time length that is longer than the first time length.

12. The method of claim 10, wherein the restricting comprises restricting the usage of the data storage system when the usage is associated with the first user identity by restricting write access to the data storage system when the write access is associated with the first user identity.

13. The method of claim 10, wherein the restricting comprises restricting the usage of the data storage system when the usage is associated with the first user identity by revoking access to the data storage system when a request for the access is associated with the first user identity.

14. The method of claim 10, wherein the recording comprises recording the user identities of the group of recorded user identities in an attribute of the file.

15. A non-transitory machine-readable medium comprising computer executable instructions that, when executed by a processor of a data storage system, facilitate performance of operations, the operations comprising:
- recording identities of users that have made at least one modification to a file stored on the data storage system, resulting in recorded users;
- incrementing respective malware counts stored in respective records of a data structure, each of the respective records being uniquely associated with respective corresponding ones of the recorded users, in response to a malware scan of the file indicating that the file contains malware, resulting in respective incremented malware counts;
- restricting usage of the data storage system by a first user of the recorded users in response to a malware count of the respective incremented malware counts stored in a record of the data structure that is uniquely associated with the first user exceeding a first threshold; and
- in response to the malware scan of the file indicating that the file does not contain malware, clearing the recorded users.

16. The non-transitory machine-readable medium of claim 15, wherein the operations further comprise:
- restricting the usage of the data storage system by the first user by restricting write access to the data storage system by the first user.

17. The non-transitory machine-readable medium of claim 15, wherein the operations further comprise:
- restricting the usage of the data storage system by the first user by revoking access to the data storage system by the first user.

18. The non-transitory machine-readable medium of claim 15, wherein the operations further comprise:
- recording the identities of the users in an attribute of the file.

* * * * *